United States Patent
Krishnamurthy et al.

(10) Patent No.: US 7,458,718 B2
(45) Date of Patent: Dec. 2, 2008

(54) TEMPERATURE SENSOR THAT ACHIEVES A FAST RESPONSE IN AN EXHAUST GAS ENVIRONMENT

(75) Inventors: Guruprasad Krishnamurthy, Bangalore (IN); Ramesh Anilkumar, Bangalore (IN); Alfred Colin Burnett, Newcastle upon Tyne (GB)

(73) Assignee: Honeywell International Inc., Morristown, NJ (US)

( * ) Notice: Subject to any disclaimer, the term of this patent is extended or adjusted under 35 U.S.C. 154(b) by 278 days.

(21) Appl. No.: 11/358,965

(22) Filed: Feb. 22, 2006

(65) Prior Publication Data

US 2007/0195857 A1 Aug. 23, 2007

(51) Int. Cl.
*G01K 1/08* (2006.01)
*G01K 7/16* (2006.01)
*G01K 13/00* (2006.01)

(52) U.S. Cl. .................. 374/208; 374/185; 374/148; 374/144

(58) Field of Classification Search ............. 374/148, 374/144, 208, 185
See application file for complete search history.

(56) References Cited

U.S. PATENT DOCUMENTS

| | | | |
|---|---|---|---|
| 4,538,927 A * | 9/1985 | Jochemczyk et al. ........ 374/163 |
| 5,106,203 A | 4/1992 | Napoli et al. ................ 374/144 |
| 5,181,007 A | 1/1993 | Friese et al. ............... 338/22 R |
| 5,726,624 A | 3/1998 | Caffee et al. .................. 338/28 |
| 6,264,363 B1 * | 7/2001 | Takahashi et al. ............ 374/185 |
| 6,485,175 B1 * | 11/2002 | Nimberger et al. .......... 374/142 |
| 6,880,969 B2 | 4/2005 | Adachi et al. ................ 374/185 |
| 6,899,457 B2 | 5/2005 | Kurano ........................ 374/185 |
| 2002/0131477 A1 * | 9/2002 | Kurano ........................ 374/185 |
| 2003/0067960 A1 * | 4/2003 | Nyffenegger et al. ........ 374/143 |
| 2007/0171959 A1 * | 7/2007 | Irrgang et al. ................ 374/185 |

* cited by examiner

*Primary Examiner*—Gail Verbitsky
*Assistant Examiner*—Mirellys Jagan
(74) *Attorney, Agent, or Firm*—Kermit D. Lopez; Luis M. Ortiz

(57) ABSTRACT

A temperature sensor and method of forming the same includes a temperature sensing portion having a metal housing configured with at least one circular fin on a surface of the metal housing. A temperature sensing element is generally associated with the temperature sensing portion, wherein a potting is located within a gap formed between the temperature sensing element and the metal housing and joined with a ceramic tube for carrying a plurality of high temperature metal lead wires to and from the temperature sensing portion, thereby forming a temperature sensor utilized in an exhaust gas environment to measure temperature and improve a response time and accuracy of the temperature sensor due to an increase in surface area of the sensor tip for a given thermal mass for convection heat transfer.

15 Claims, 3 Drawing Sheets

TEMPERATURE SENSOR THAT ACHIEVES A FAST RESPONSE IN AN EXHAUST GAS ENVIRONMENT

TECHNICAL FIELD

Embodiments are generally related to sensor systems and methods. Embodiments are also related to temperature sensors. Embodiments are additionally related to temperature sensors utilized in harsh and corrosive conditions such as, for example, exposure to the exhaust gas of automobiles.

BACKGROUND

Temperature sensors are utilized in a variety of applications. For example, temperature sensors that are used in conjunction with ovens typically comprise a metallic tube in which a temperature sensitive element is disposed inside one end with conductive wires extending within the tube from the temperature sensitive element to an opening at the other end of the tube. The metallic tube is inserted through a wall of the oven to permit the temperature sensitive element to be placed in thermal communication with the internal cavity of the oven. The temperature sensitive element is typically a resistive temperature detector, or RTD. The temperature sensor can be also based on a thermistor or thermocouple configuration, a metal oxide semiconductor, or any other type of temperature sensing element.

One area where temperature sensors find particular usefulness is in the area of exhaust gas environments. Various applications require measurement of temperature of gas or mixture of gases at elevated temperatures. One such application involves automotive or combustion applications in which a need exists for measuring the exhaust gas temperature for emission control using Selective catalytic reduction (SCR) and Exhaust Gas Recirculation (EGR) based emission after treatment systems. The sensor should function in a harsh and corrosive automotive exhaust gas environment containing, for example, soot particles, $SO_x$, moisture, diesel, $NH_3$, $NO_x$, HC, CO, $CO_2$ etc.

Exhaust gas temperature (EGT) can be utilized to measure the performance, for example, of an automotive engine. The exhaust gas temperature also provides an indication of the rate of deterioration of automotive engine components. Thus, since the exhaust gas temperature is an indicator of engine status, it may be used to measure and control operational and functional characteristics of the engine.

Accurate measurement of the exhaust gas temperature level is important. To accurately measure exhaust gas temperatures, it is necessary to minimize degradation of the EGT measurement system. Thus it is desirable that the EGT measurement system compensate for engine to engine variations and combustor exit temperature profiles. In addition, the measurement system should compensate for shifts in engine profiles that may occur with progressive deterioration of the engine components.

The penetration of a particular sensor can be determined by the temperature profile of the exhaust gases. The exhaust gas temperature profile is determined by the number, type and arrangement of the combustion nozzles in the combustor. The exhaust gas temperature profile for a particular engine may be determined by using a large number of thermocouple elements arranged in a number of sensors around the exhaust passage and at various penetration depths. Once the exhaust gas temperature profile is defined for a particular type of engine, it may be used to calculate the number and arrangement of EGT sensors necessary to monitor the exhaust gas temperature during normal engine operation.

As indicated above, a variety of temperature sensing elements can be utilized in the context of an exhaust gas temperature sensor. Resistance Temperature detectors (RTD) elements can be used in temperature measuring equipment. The RTD Element has a ceramic substrate with a platinum or nickel or similar metal thin/thick film resistor with an over coating of a protective layer like glass or ceramic or any other material glazing, which is thermally a good conductor. Wire wound RTD elements are also available. Materials such as, for example, platinum or nickel have a positive co-efficient of temperature and the resistance increases linearly with increase in temperature.

Thermistors are also utilized in temperature measuring equipment. Thermistors are essentially semiconductor devices, which behave as thermal resistors having high negative or positive temperature co-efficient of resistance. Thermistors are made of sintered metal oxide ceramics like oxides of iron, magnesium, nickel, cobalt and copper in the form of beads or discs or rods. The variation in temperature is non linear, resistance decreases with increase in temperature in case of negative temperature co-efficient (NTC) of resistance thermistor and resistance increases with increase in temperature in case of positive temperature co-efficient (PTC) of resistance thermistor.

Thermocouples, for example, are the most commonly used temperature sensing devices and operated based on the principle of the so-called See-Beck effect, i.e., when two dissimilar metal or ceramic or metal oxide semiconductor junctions are maintained at different temperature an EMF is induced at the junction, which is proportional to temperature difference. Generally Platinum with copper, Constantan, Nickel, Rhodium, Iron, Gold, $ZrO_2$, $Al_2O_3$, $CeO_2$ and so forth can be utilized.

The sensing element can be suitably packaged and placed in a gas flow path and the temperature is measured by using a suitable electronic circuit by transduction of resistance or voltage. In general, two types of packaging methods are available. The first method involves the so-called Open Sensing Tip Sensor method where the sensing element is exposed to gas stream directly. The second method is the Closed Sensing Tip Sensor method, where the sensing element is not directly exposed to gas stream and packaged inside a metal housing high temperature potting around the sensing element. These techniques have specific disadvantages, which are summarized below in Table 1:

TABLE 1

| | | Open Sensing Tip Sensor | Closed Sensing Tip Sensor |
|---|---|---|---|
| Disadvantages | | 1. Has less protection for sensing element from $NH_3$/$SO_x$/$NO_x$/moisture/Diesel/$SO_2$/soot particles etc available in the harsh exhaust environment. | 1. The Closed Sensing Tip construction has slower response ($t_{63}$) as the sensing element is not directly exposed to gas. |

TABLE 1-continued

| Open Sensing Tip Sensor | Closed Sensing Tip Sensor |
| --- | --- |
| 2. Has less protection for sensing element against vibration and shock.<br>3. Has less leak protection at the sensing tip.<br>4. Has less reliability because of the above reasons. | 2. Less accurate at high temperatures as there is significant temperature gradient between gas and sensing element. |

The ability to accurately measure temperature in an exhaust gas environment can be based on a number of critical factors. For example, in some applications it is desirable to achieve a dynamic response time $t_{63}$ less than 15 seconds and a static response for an RTD-based closed sensor intended for measuring the temperature of exhaust gas in an automotive environment. The dynamic response $t_{63}$ represents the time taken by the sensor to attain 63.2% of the medium temperature for a particular test condition (e.g., medium, temperature of the medium, flow rate of the medium, density of the medium, etc). Static response, on the other hand, constitutes the temperature difference between the outer surface of the metal housing and RTD surface under a static steady state condition and can have a significant impact on the accuracy of the sensor. It is preferred that such a closed sensor be subjected to harsh hot exhaust gas, along with, for example, diesel, moisture, vibration and/or other fluids and/or gasses over a temperature range of, for example, −40° C. to 750° C.

Prior art approaches involve utilizing a small tip structure to house an RTD sensing element. Such devices, however, have not been found to work in such a scenario because of the physical limitations of mass-to-area ratio (m/a), which governs the response time. Thus, there is a need to reduce the m/a ratio in order to reduce the response time in order to achieve greater efficiencies and accurate readings in a gas exhaust environment utilizing an RTD-based temperature sensor. It is believed that the system and method disclosed herein in greater detail solves this important and heretofore unmet need.

BRIEF SUMMARY

The following summary is provided to facilitate an understanding of some of the innovative features unique to the embodiments and is not intended to be a full description. A full appreciation of the various aspects of the embodiments disclosed can be gained by taking the entire specification, claims, drawings, and abstract as a whole.

It is, therefore, one aspect of the present invention to provide for an improved temperature sensor.

It is yet another aspect of the present invention to provide for an improved exhaust gas temperature sensor.

It is a further aspect of the present invention to provide for a system and method for achieving a fast response time in an RTD-based closed temperature sensor utilized in automotive exhaust gas environments.

It is also an aspect of the present invention to provide a Closed Sensing Tip housing a temperature sensing element with improved response and accuracy.

It is yet a further aspect of the present invention to provide a suitable packaging that functions accurately for long term in a harsh, corrosive, high temperature, high pressure, varying gas density environment such as that found in the exhaust gas of automobiles.

The aforementioned aspects of the invention and other objectives and advantages can now be achieved as described herein. A temperature sensor and method of forming the same is disclosed, which includes a temperature sensing portion having a metal housing configured with at least one circular fin on a surface of the metal housing. A temperature sensing element is generally associated with the temperature sensing portion, wherein a potting is located within a gap formed between the temperature sensing element and the metal housing and joined with a ceramic tube for carrying a plurality of high temperature metal lead wires to and from the temperature sensing portion, thereby forming a temperature sensor utilized in an exhaust gas environment to measure temperature and improve a response time and accuracy of the temperature sensor due to an increase in surface area for convection heat transfer.

BRIEF DESCRIPTION OF THE DRAWINGS

The accompanying figures in which like reference numerals refer to identical or functionally-similar elements throughout the separate views and which are incorporated in and form a part of the specification, further illustrate the embodiments and, together with the detailed description, serve to explain the principles of the disclosed embodiments.

DETAILED DESCRIPTION

The particular values and configurations discussed in these non-limiting examples can be varied and are cited merely to illustrate at least one embodiment and are not intended to limit the scope of the invention.

Figure 1:
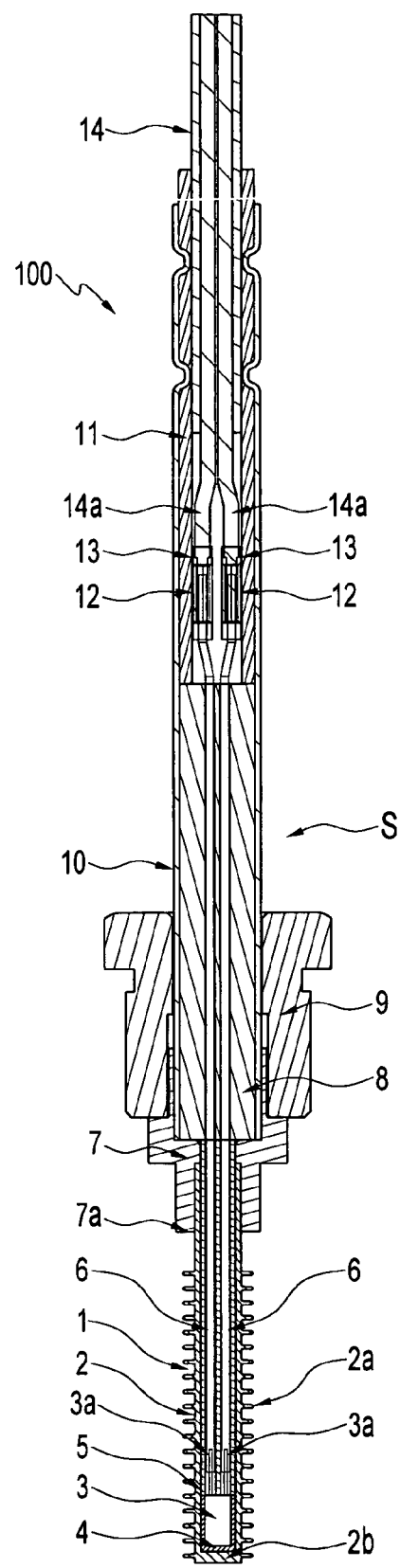
FIG. 1 illustrates a partial sectional view depicting the overall construction of a temperature sensor according to an embodiment.
Figure 2:
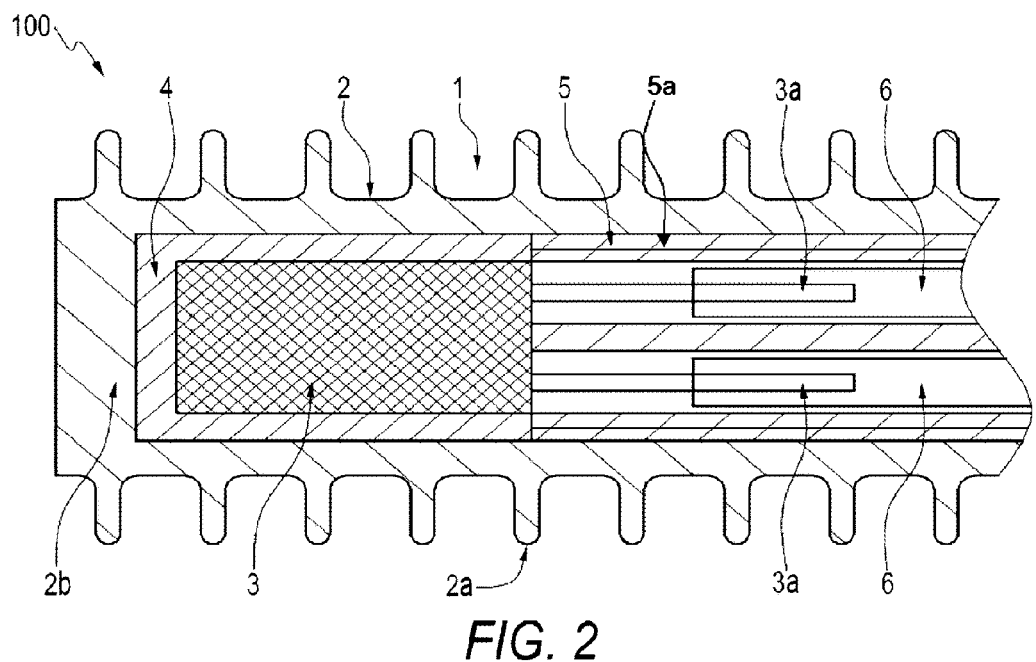
FIG. 2 illustrates an enlarged sectional view of the temperatures sensor depicted in FIG. 1 in accordance with an embodiment.

FIG. 1 illustrates a partial sectional view of a temperature sensor 100, which can be implemented in accordance with a preferred embodiment. FIG. 2 illustrates an enlarged sectional view of the temperatures sensor 100 depicted in FIG. 1 in accordance with a preferred embodiment. Note that in FIGS. 1-2, identical or similar parts or elements are generally indicated by identical reference numerals. FIGS. 1-2 indicate that a temperature sensing portion 1 of the temperatures sensor 100 can be provided with a metal housing 2 having circular fins 2a on its surface composed of a temperature sensing element 3 and a high temperature potting 4 filled in a gap between the temperature sensing element 3 and finned metal housing 2 with a ceramic tube 5 for carrying the high temperature metal lead wires 6.

In some embodiments, the ceramic tube 5 can be configured with a cylindrical shape with bores for carrying the high temperature metal lead wires 6. In other embodiments, the ceramic tube 5 can be arranged from one or more semi/split cylindrically shaped components for ease of assembly of the high temperature metal lead wires 6. The ceramic tube 5 can also be configured with grooves 5a on the outer surface of the tube 5 along the entire length of the tube 5 for easy filling of the potting compound described in greater detail herein. Additionally, the ceramic tube 5 can also be configured with a step for locating the same inside the metal housing. In other embodiments, the metal housing 2 may actually be configured with plastic. The material of the metal housing 2 can be, for example, a high temperature metal (e.g., stainless steel) for high temperature applications. Plastic, however, can be utilized for lower temperature applications in place of the metal that forms housing 2 or in addition to the metal used to form the housing 2, depending upon design considerations.

The temperature sensor 100 can be used in an exhaust gas environment to measure its temperature whereby the response time and accuracy of the sensor are improved due to increased surface area for convection heat transfer and provides better protection to temperature sensing element 3 against harsh and corrosive automotive exhaust gas environment. Note that the circular fins 2a can be configured in other shapes besides circular fins. That is, circular fins 2a constitute one or more projections formed on the surface of the metal housing 2 and can be, for example, linear fins, helical fins or any other type of projection on the surface of metal housing 2 for improving the surface area for convection heat transfer.

In order to further an understanding of the embodiments disclosed herein, it is helpful to refer basic thermodynamic and heat transfer concepts, which are presented below with respect to equations (1) and (2), which generally relate to transient heat conduction. In general, a sensor can be considered as a lumped system in which the temperature of the body varies with time but remains uniform throughout the solid at any time. This can simplify the analysis significantly. A governing equation (1) is illustrated below.

$$\ln\left[\frac{T(t) - T_\infty}{T_i - T_\infty}\right] = -\frac{hA}{\rho V C_p} t \quad (1)$$

Where, $T_\infty$ is the Temperature of the medium (exhaust gas);

$T_i$ is the Initial Temperature of the temperature sensing portion 1;

T(t) is the Temperature of the temperature sensing portion 1 at time t;

t is the time taken to reach specific temperature T(t);

h is the convection heat transfer coefficient between the medium (exhaust gas) and the temperature sensing portion 1;

A is the surface area of the temperature sensing portion 1 available for convection heat transfer;

$\rho$ is the overall density of the temperature sensing portion 1;

V is the overall volume of the temperature sensing portion 1; and $C_p$ is the overall Specific heat of the temperature sensing portion 1.

For a lumped system analysis and a $t_{63}$ condition, the above equation (1) can be is simplified as indicated in equation (2) below:

$$t_{63} = \frac{C_p * M}{h * A}$$

Where, M is the overall mass ($\rho*V$) of the temperature sensing portion 1;

For a given medium, its flow rate and specific constituent materials of the temperature sensing portion 1, $C_p$ and h are constant. Hence it is evident from the above equations (1) and (2) that the response time can be reduced by reducing the mass of the temperature sensing portion 1 and by increasing the surface area for convection heat transfer of the temperature sensing portion 1. In other words, lowering the mass to surface area ratio of the temperature sensing portion 1 with the same constituent materials used will bring down the response time.

A series of calculations and experiments can be carried out with respect to different shapes and sizes of the metal housing. It is understood, of course, that the response time cannot be improved better than a particular value as there is a physical limitation on the mass to surface area ratio that can be achieved with the regular Closed Sensing Tips. Hence, an approach can be implemented to reduce the mass to surface area ratio of the temperature sensing portion 1 by adding circular fins 2a on the surface of the temperature sensing portion 1. This modification increased the surface area of the temperature sensing portion 1 significantly compared to the mass of the temperature sensing portion 1 effectively reducing the mass to surface area ratio of the temperature sensing portion 1.

The details of the concept are provided in FIG. 1, which illustrates the overall construction of a temperature sensor 100 according to one of the embodiment. FIG. 2 illustrates an enlarged view of a sectional structure within a metal housing 2 that constitutes a temperature sensing portion in FIG. 1. This temperature sensor 100 can be applied to an exhaust gas temperature sensor used in high temperature environment of around 750° C. or higher, for example. This temperature sensor 100 can also be used for any other temperature measurement application in the temperature range –40° C. to 750° C. or higher, for example.

Referring to FIG. 2, the temperature sensing portion 1 is described in greater detail. Reference numeral 2 denotes a metal housing configured from a metal such as, for example, stainless steel, which is superior in heat resistance. In the view depicted in FIG. 2, the metal housing 2 has been formed in to a cylindrical shape having a bottom portion at one end and an opening at the other end with circular fins 2a around the outer surface. A temperature sensing element 3 can be housed in the metal housing 2 at one end thereof (the end where the bottom portion is provided) with high temperature potting 4 (i.e., potting compound) filled all around between metal housing 1 and temperature sensing element 3.

The temperature sensing element 3 can be a thermistor or RTD or a thermocouple bead or any other type of temperature sensing element. High temperature potting 4 is made from ceramics (e.g., magnesium oxide). The metal housing 2 can also have an open bottom portion 2b for easy filling of high temperature potting 4 and then be covered with a metal bottom cover joined by welding. Note that the potting compound 4 used for high temperature applications may be ceramic-based. Compounds, such as, various types of epoxies, however, can be utilized for lower temperature applications in place of a ceramic-based material when configuring compound 4.

The temperature sensing element 3 can endure use at a high temperature (e.g., 750° C., or higher) and can be configured in a rectangular block shape like hat of a sintered molded body, depending of course on design considerations. In addition, a pair of high temperature metal lead wires 6 can be connected to the temperature sensing element 3 for detecting an output signal. The high temperature metal lead wires 6 can be connected to signal lead wires 3a of the temperature sensing element 3 by welding and then inserted in to a two bore cylindrical ceramic tube 5 which runs along the length of the metal housing 2. The material of the high temperature metal lead wires 6 is a metal such as stainless steel which is superior in heat resistance and its temperature co-efficient of resistance is very less to reduce any errors added to temperature sensing element 3 output signal.

The ceramic tube 5 can also possess a split cylindrical shape for easy assembly of the temperature sensing element 3 and high temperature metal lead wires 6. The ceramic tube 5 can be formed from a material such as, for example, a high temperature ceramic (e.g., Zirconium oxide). All components in the temperature sensing portion 1 have been selected such that the linear expansion coefficient matches.

The metal housing 2 can be joined to the collar fitting 7 by welding. The collar fitting 7 can also be formed from a metal material such as, for example, stainless steel, which is superior in heat resistance. On the other end of the collar fitting 7, an extension tube 10 constructed from a metal such as stainless steel, which is superior in heat resistance, can be joined by welding. A fixing nut 9 can be inserted over the extension tube 10, which is generally free to rotate over the collar fitting 7. The purpose of the fixing nut 10 is to fasten the temperature sensor in a mounting hole. The fixing nut 9 can also be configured from a metal such as stainless steel, which is superior in heat resistance. The fixing nut 9 can be configured loose and free to rotate about the collar fitting 7 (also referred to simply as a "collar"). Alternatively, however, the fixing 9 can be an integral part of the collar 7 per a customer or user requirements.

The high temperature metal lead wires 6 are now taken through an extension tube ceramic 8, which can be configured in the context of a two bore cylindrical ceramic insulator constructed from a high temperature ceramic (e.g., zirconium oxide). The high temperature metal lead wires 6 can be connected to a metal splices 12 crimped on to the leads of the primary wires 14a from the high temperature cable assembly 14 by welding and covered with high temperature heat shrink insulation 13. The high temperature cable assembly 14 can possess a high temperature resistant polymer or rubber jacket and two primary wires 14a having either bare copper or plated copper leads insulated with high temperature resistant polymer. The high temperature metal lead wires 6 can be connected to the high temperature cable assembly 14 for external connection. The high temperature cable assembly 14 can be constructed so as to be electrically connected to an external circuit, not shown, and the temperature sensor 100 and the external circuit are able to communicate with each other in order to exchange signals.

A high temp plastic sleeve 11 can be inserted between the extension tube 10 and the high temperature cable assembly 14 till it comes in contact with the extension tube ceramic 8 and then extension tube 10 is circular crimped at two places to hold the high temperature cable assembly 14 and high temp plastic sleeve 11 in place. The material of the high temp plastic sleeve 11 is a polymer which can withstand >200° C. temperature continuously.

The above description completes the construction details of the temperature sensor 100. This temperature sensor 100 can be inserted into, for example a mounting hole (not shown) formed in an exhaust pipe of an automobile, and the temperature sensor 100 can be positioned in the mounting such that the butting surface 7a of the collar fitting 7 locates inside the mounting and then fastened to the mounting using fixing nut 9.

Then, when a fluid (e.g., exhaust gas) whose temperature is to be measured comes in contact with the temperature sensing portion 1 which protrudes into the exhaust pipe, a signal corresponding to the temperature of the fluid to be measured is designed to be outputted to the external circuit via high temperature metal lead wires 6 and high temperature cable assembly 14 as a signal from the temperature sensing element 3.

As has been described heretofore, this embodiment is mainly characterized in that by the addition of circular fins 2a around the outer surface of the metal housing 2 which forms a part of the temperature sensing portion 1 of the temperature sensor 100. The temperature sensing portion 1 can include a Temperature sensing element 3, a high temperature potting 4, ceramic tube 5 and a high temperature metal lead wires 6 as described heretofore.

According to the embodiment, circular fins 2a can be positioned on the outer surface of the metal housing 2a to improve the surface area for convection heat transfer of the temperature sensing portion 1 and significantly compared to the mass, thereby improving the response time $t_{63}$ and accuracy of the temperature sensor 100.

Here specific results of evaluation of improvement in response time $t_{63}$ testing will be illustrated below. A sample provided with circular fins 2a as in the case of this embodiment was prepared, whereas a sample without circular fins 2a and another sample with the temperature sensing element 3 directly exposed (not covered by high temperature potting and metal housing with opening for exposing temperature sensing element 3) were prepared as a comparison example. Response time $T_{63}$ tests were carried out on all the three samples under same test conditions of temperature step and gas flow rate.

Figure 3:
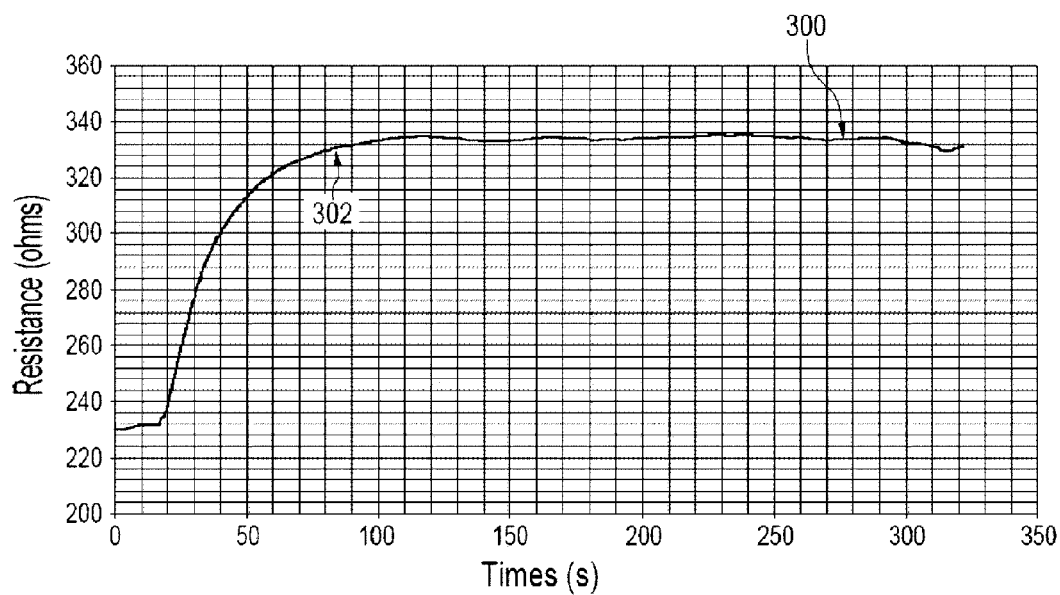
FIG. 3 illustrates a graph depicting a response time for a conventional Closed Sensing Tip sensor.
Figure 4:
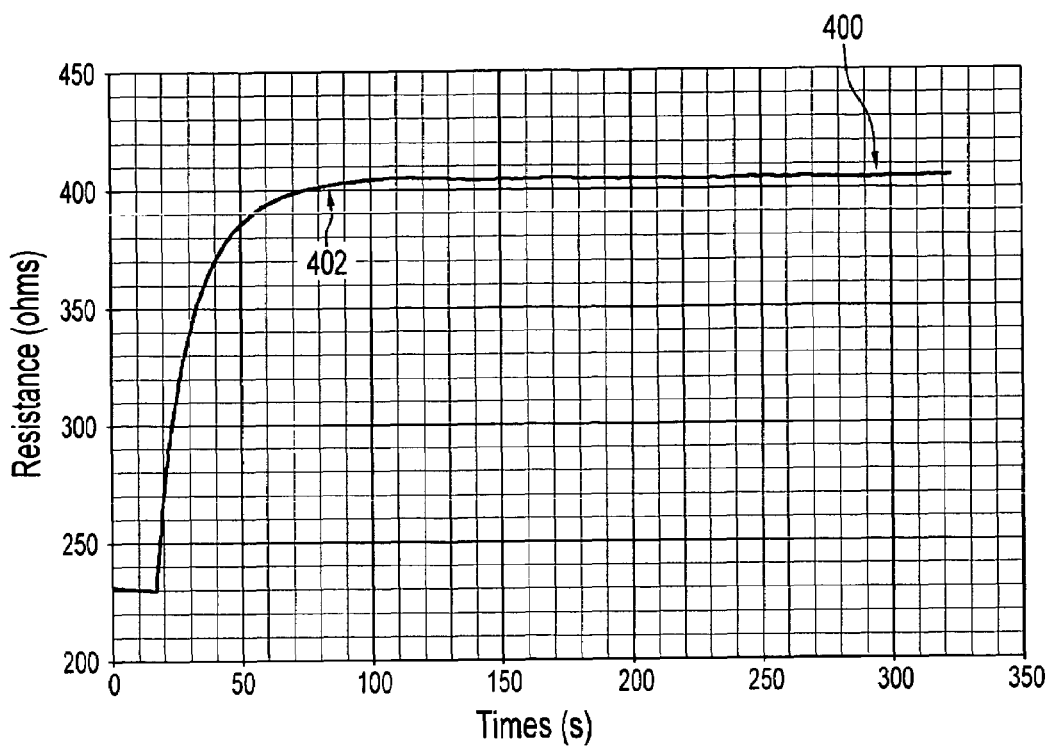
FIG. 4 illustrates a graph depicting the response time for an Open Sensing Tip sensor.
Figure 5:
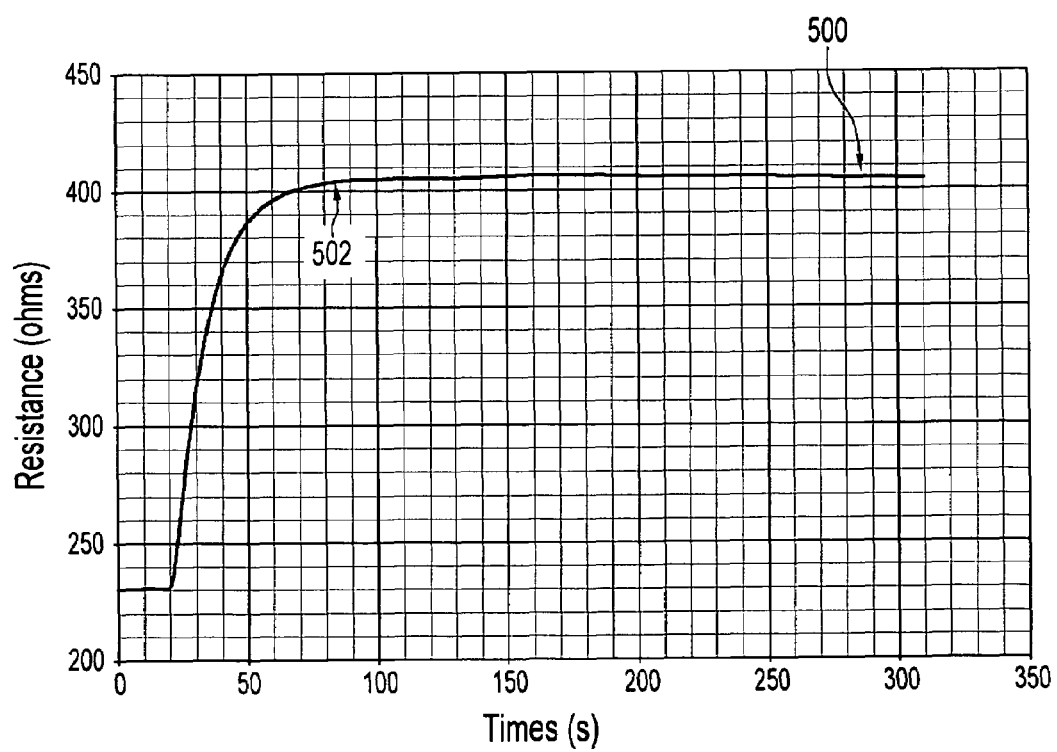
FIG. 5 illustrates a graph depicting the response time for a Finned Closed Sensing Tip sensor with a finned metal housing, which can be implemented in accordance with a preferred embodiment.

FIG. 3 illustrates a graph 300 and a curve 302 thereof depicting a response time for a conventional Closed Sensing Tip sensor. FIG. 4 illustrates a graph 400 and a curve 402 thereof depicting the response time for an Open Sensing Tip sensor. Likewise, FIG. 5 illustrates a graph 500 and a curve 502 thereof depicting the response time for a Finned Closed Sensing Tip sensor with a finned metal housing, which can be implemented in accordance with a preferred embodiment.

The resultant response curves of tests carried out are shown in FIG. 3, FIG. 4 and FIG. 4 for sample without circular fins 2a, sample with the temperature sensing element 3 directly exposed and sample provided with circular fins 2a respectively. Note that in FIG. 3, FIG. 4 and FIG. 5 the graphs have the output resistance of the temperature sensing element 3 corresponding to the test medium temperature plotted against time in a response time constant test. The results can also be summarized in the form of a result comparison table for key performance parameters as provided by Table 2 below.

TABLE 2

Comparison of Key Performance Parameters

| KEY PERFORMANCE PARAMETER | CLOSED SENSING TIP SENSOR | OPEN SENSING TIP SENSOR | FINNED CLOSED SENSING TIP SENSOR |
|---|---|---|---|
| RESPONSE TIME $t_{63}$ | 20.9 SEC | 13.6 SEC | 14.0 SEC |
| SETTLING RESISTANCE (Controls Accuracy of the sensor) | 330 OHMS (~75 OHMS DIFFERENCE) | 405.5 OHMS (ACT READING) | 406 OHMS (VERY CLOSE TO ACT READING) |
| RESPONSE TIME $t_{90}$ | ~100 SEC | ~86 SEC | ~84 SEC |
| SIGNAL STABILITY | POOR DUE TO VARIATION IN SETTLING VALUE | VERY GOOD | VERY GOOD |
| TYPE OF RESPONSE | EXPONENTIAL | LUMPED - EXPONENTIAL | LUMPED - EXPONENTIAL |
| REPEATABILITY | POOR | VERY GOOD | VERY GOOD |

It can be appreciated from data illustrated in Table 2 for key performance parameters that the response time $t_{63}$ for the finned Closed Sensing Tip temperature sensor 100 can be improved significantly by 6.9 sec compared to the conventional Closed Sensing Tip sensor and is very close to the response time $t_{63}$ of the Open Sensing Tip sensor with the difference being 0.4 sec only. Similar result pattern can be seen in case of response time $T_{90}$ comparison where the values for finned Closed Sensing Tip temperature sensor 100 and Open Sensing Tip sensor are very close while the conventional Closed Sensing Tip sensor is slower by ~15 sec.

The settling resistance value corresponding to the temperature of the fluid (exhaust gas) for the finned Closed Sensing Tip temperature sensor 100 is very close to the settling resistance value of Open Sensing Tip sensor. There is a difference between the settling resistance value of the conventional Closed Sensing Tip sensor and the Open Sensing Tip sensor which will lead to inaccuracy of the temperature sensor 100.

Additionally, the signal stability of the finned Closed Sensing Tip temperature sensor 100 is very good with the output signal stabilizing at a constant resistance value similar to the Open Sensing Tip sensor. Conventional Closed Sensing Tip sensor has shown variation in signal indicating a possible imbalance of thermal energy inside the temperature sensing portion.

Table 2 also demonstrates that the type of response shown for both finned Closed Sensing Tip temperature sensor 100 and Open Sensing Tip sensor is Lumped-exponential and the repeatability is good when tested repeatedly under same test conditions.

In addition, The temperature sensor 100 can be more reliable by virtue of temperature sensing element 3 packaged well inside a metal housing 2 with high temperatures potting 4 filled around protecting it from direct exposure to harsh automotive exhaust gas environment containing soot particles, $SO_2$, Moisture, diesel etc. The temperature sensing element 3 is also protected well against vibration it is not a cantilever as in the case of Open Sensing Tip configuration. The disadvantages of both conventional Closed Sensing Tip sensor and Open Sensing Tip sensor have been significantly reduces by this invention.

In summary, a temperature sensor in which the temperature sensing element can be packaged within a finned closed metal housing with two bore ceramic tube and high temperature potting filled in the gap between the metal housing and temperature sensing element which achieves response time and accuracy performance very close to the Open Sensing Tip sensor and protection against harsh automotive exhaust gas environment like a conventional Closed Sensing Tip sensor.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A temperature sensor, comprising:
   a temperature sensing portion having a metal housing configured with a projection on a surface of said metal housing, wherein said projection improves a surface area of said surface for convection heat transfer thereof; and
   a temperature sensing element associated with said temperature sensing portion, wherein a potting is located within a gap formed between the temperature sensing element and said metal housing and joined with a ceramic tube, configured such that an outer surface of said ceramic tube comprises a plurality of grooves formed therein for ease of filling of said potting, for carrying a plurality of high temperature metal lead wires to and from said temperature sensing portion, thereby forming a temperature sensor utilized in an exhaust gas environment to measure temperature and improve a response time and accuracy of said temperature sensor due to an increase in said surface area for convection heat transfer, while also applicable to low temperature applications.

2. The sensor of claim 1 wherein said temperature sensing element comprises a Resistance Temperature Detector (RTD).

3. The sensor of claim 1 wherein said plurality of high temperature metal lead wires comprises a metal having a strong heat resistance and a low temperature co-efficient of resistance in order to reduce errors added to a signal output from said temperature sensing element.

4. The sensor of claim 1 wherein said metal housing comprises a metal having a high temperature resistance.

5. The sensor of claim 1 wherein said potting comprises a ceramic.

6. The sensor of claim 1 wherein said potting comprises an epoxy material for low temperature applications.

7. The sensor of claim 1 wherein said metal housing further comprises a plastic material for low temperature applications.

8. The sensor of claim 1 wherein said ceramic tube comprises a cylindrical shape and is configured with a plurality of bores for carrying said plurality of high temperature metal lead wires.

9. The sensor of claim 8 wherein said ceramic tube is formed from a plurality of semi-cylindrical components for ease of assembly of said plurality of high temperature metal lead wires.

10. A temperature sensor, comprising:
a temperature sensing portion having a metal housing configured with a projection on a surface of said metal housing, wherein said projection improves a surface area of said surface for convection heat transfer thereof; and
a temperature sensing element associated with said temperature sensing portion, wherein said temperature sensing element comprises a Resistance Temperature Detector (RTD) and wherein a potting is located within a gap formed between the temperature sensing element and said metal housing and joined with a ceramic tube, configured such that an outer surface of said ceramic tube comprises a plurality of grooves formed therein for ease of filling of said potting, for carrying a plurality of high temperature metal lead wires to and from said temperature sensing portion, thereby forming a temperature sensor utilized in an exhaust gas environment to measure temperature and improve a response time and accuracy of said temperature sensor due to an increase in said surface area for convection heat transfer, while also applicable to low temperature applications.

11. The sensor of claim 10 wherein said plurality of high temperature metal lead wires comprises a metal having a strong heat resistance and a low temperature co-efficient of resistance in order to reduce errors added to a signal output from said temperature sensing element.

12. The sensor of claim 10 wherein said metal housing comprises a metal having a high temperature resistance.

13. A method for forming a temperature sensor, comprising:
providing a temperature sensing portion with a metal housing;
configuring on a surface of said metal housing, a projection that improves a surface area of said surface for convection heat transfer thereof; and
associating a temperature sensing element with said temperature sensing portion, wherein a potting is located within a gap formed between the temperature sensing element and said metal housing and joined with a ceramic tube, configured such that an outer surface of said ceramic tube comprises a plurality of grooves formed therein for ease of filling of said potting, for carrying a plurality of high temperature metal lead wires to and from said temperature sensing portion, thereby forming a temperature sensor utilized in an exhaust gas environment to measure temperature and improve a response time and accuracy of said temperature sensor due to an increase in said surface area for convection heat transfer, while also applicable to low temperature applications, wherein said temperatures sensing element comprises an RDT (Resistance Temperature Detector).

14. The method of claim 13 further comprising configuring said metal housing to include a closed bottom portion or an open bottom portion for efficient filling of said potting therein.

15. The method of claim 13 further comprising:
configuring said metal housing to maintain said temperature sensing element, said potting, said ceramic tube and said plurality of high temperature metal lead wires; and forming said plurality of high temperature metal lead wires from a metal having a strong heat resistance and a low temperature co-efficient of resistance in order to reduce errors added to a signal output from said temperature sensing element.

* * * * *